US006779999B2

(12) United States Patent
Ciccone (10) Patent No.: US 6,779,999 B2
(45) Date of Patent: Aug. 24, 2004

(54) CENTERING APPARATUS FOR INJECTION MOLD MACHINE

(75) Inventor: Vince Ciccone, Kleinburg (CA)

(73) Assignee: Injectnotech Inc., Mississauga (CA)

( * ) Notice: Subject to any disclaimer, the term of this patent is extended or adjusted under 35 U.S.C. 154(b) by 173 days.

(21) Appl. No.: 10/121,371

(22) Filed: Apr. 12, 2002

(65) Prior Publication Data
US 2003/0194461 A1 Oct. 16, 2003

(51) Int. Cl.[7] .............................................. B29C 45/66
(52) U.S. Cl. ....................... 425/171; 425/173; 425/190; 425/192 R; 425/451.7; 425/588; 425/338
(58) Field of Search ................................. 425/169, 171, 425/173, 190, 192 R, 338, 451.7, 588, 589

(56) References Cited

U.S. PATENT DOCUMENTS

| 5,378,140 A | * | 1/1995 | Asano et al. ............ 425/451.7 |
| 5,688,537 A | | 11/1997 | Brams et al. |
| 6,089,852 A | | 7/2000 | Lee et al. |
| 6,106,265 A | | 8/2000 | Von Holdt |
| 6,250,906 B1 | * | 6/2001 | Kodric ....................... 425/190 |

* cited by examiner

Primary Examiner—James P. Mackey
(74) Attorney, Agent, or Firm—Hodgson Russ LLP (57) ABSTRACT

An elongate threaded rod member comprises a central portion, and two oppositely extending outer portions. The central portion is attached to the periphery of the first plate, is rotatable with respect to the first plate and is prevented from axial movement relative thereto. Each outer portion includes a threaded portion with each having the same threading pitch and density but being in opposite orientation. A threaded connector is secured to the periphery of each second plate with each threaded portion in screw-threaded relation. The threaded portions rotate within each bore an equal an opposite amount, equalizing the distances of each second mold plate from the first mold plate as the apparatus is moved between open and closed positions. At least one outer portion is releasably detachable from the central portion, thereby allowing at least one second mold plate to be separated from the first plate along the mold axis beyond the open position and beyond the length of the threaded portions without the threaded connector losing threaded engagement with the threaded rod portion.

17 Claims, 7 Drawing Sheets

CENTERING APPARATUS FOR INJECTION MOLD MACHINE

FIELD OF THE INVENTION

This invention relates to a centering mechanism for use with injection mold systems and in particular to a centering mechanism utilizing a threaded rod to connect and maintain proper spacing of mold plates in the injection mold system.

BACKGROUND OF THE INVENTION

It is well known in the art of injection molding to use opposing faces of adjacent mold plates, one defining a cavity, the other including a mold core which mates with the cavity, creating a cavity therebetween. These plates are brought together and molten plastic is injected between adjacent mating plates. Mold plates are cooled to cause solidification of the plastic. The plates are then separated and the finished plastic article ejected. In order to achieve high volume production, a stack mold is often used, wherein two or more sets of molds are interspersed in sequence in which rows of mold cores and mold cavities (often referred to as mold levels or mold sets) are stacked in a single machine. In conventional stack molds, typically, a central, first mold plate is provided, for holding the mold cavities of the respective stacks of molds. Typically, the central plate comprises two or more abutting plates, and is connected to cooling lines and the like for cooling of the injected molten plastic.

Two outer, second mold plates are located on either side of the central plate, with the entire system opening and closing during the molding process. One of the outer, second mold plates is affixed to a stationary platen of a conventional molding machine, while the other outer mold plate is attached to the moveable platen, so this other outer, second mold plate and the central first mold plate move in the opening and closing process of molding.

For a stack mold to operate properly the mold plates must have equal spacing between them all the time. The prior art reveals various systems for spacing the central first plate (often referred to as the floating hot runner) from the second plates. Once such system comprises a threaded rod carried by a central plate, which engages threaded sleeves carried by second mold plates. These are attached to the peripheries of the respective mold plates, and serve to keep the first, central mold plate centered between the second plates on either side of the central mold.

An example of a mold plate centering system is shown in U.S. Pat. No. 6,106,265 to Von Holdt. The system disclosed in U.S. Pat. No. 6,106,265 comprises a threaded rod having first and second parts each extending oppositely and outwardly from the first central plate toward the respective second plates. The respective threaded rod parts are typically integrally connected at their central ends where they are retained in rotatable relation to the center mold. The threads of the respective threaded rods are of opposite rotational sense to each other, one extending clockwise and the other counterclockwise.

Such a mold plate centering system is typically placed on each side of the mold set to ensure maximum stabilization. Each of the second plates carries an internally threaded sleeve as part of the mold plate centering system, with each threaded rod part occupying at least a portion of a bore within said sleeve in screw-threaded relationship. Thus, as the respective second plates are moved by the moveable mold platen of the stack mold to which mold system is attached, the threaded shafts of each rod part spontaneously rotate, driven by the screw threads of the internally threaded sleeves on the second plates and the degree of movement of both plates and is firmly limited by the number of rotations of the joined, threaded shafts. Thus, the position of the first plate relative to second plates is strictly controlled and constrained, typically to be exactly equidistant between the respective two second plates at all times along the path of motion and in all positions.

For various reasons, such as to perform stack mold maintenance, unexpected stack mold repair, insert changes on the mold, access to the mold plates is often required. With the utilization of mold centering systems such as that described above, access to the mold plates is somewhat restricted. In particular, with such centering systems, opening of the mold is limited to the length of the threaded portion of the rods because if the mold set is opened beyond the length of the threaded portion of the rods, the threaded rods will disengage from the internally threaded sleeves on the second plates due to their axial rotation. If one of the threaded portions of the rod does become disengaged from the sleeves, in order to ensure that the centering system achieves its desired function of keeping the second plates equidistant from the first plate, realigning of the threaded rod portions within the sleeves is required. Any rotation of the rod while one threaded portion is disengaged and the other engaged will cause the rods to be improperly aligned when reengaged. As such, proper realignment tends to be quite tedious and requires significant time to achieve.

SUMMARY OF THE INVENTION

It is an object of the invention to provide an improved stack mold centering system which allows easier access to the mold plates than the centering systems disclosed in the prior art, namely without requiring disengagement of the threaded rods from the mold plates.

The present invention provides an injection mold centering apparatus utilizing a threaded rod secured between mold plates. The mold centering apparatus of the present invention allows the stack mold to be fully opened without the rod losing threaded engagement of mold plates. This is achieved by portions of the threaded rod being separable from each other.

According to one aspect of the present invention, there is provided a mold centering apparatus for controlling relative movement between mold plates in a stack mold, the stack mold comprising a first mold plate positioned between a pair of second mold plates. The first mold plate is connected to the second mold plates by the centering apparatus of the invention. The mold plates are movable along a mold axis between an open position and a closed position. The mold plate includes mold faces on opposite sides of said first plate. The second plates are designed for mating with the faces on opposite sides of the first plate such that in the closed position, molten plastic may be injected between the first and second plates, for producing molded plastic products.

The centering apparatus comprises an elongate threaded rod member comprising a central portion, and two oppositely extending, outer portions extending from the central portion parallel to the mold axis toward each of the second plates. The central portion is attached to a peripheral portion of the first plate. The rod member is axially rotatable with respect to the first plate and the rod member is prevented from axial movement relative to said first plate. Each outer portion includes a threaded portion with the threaded portions of each outer portion having the same thread count and pitch but being in opposite orientation to the other. A threaded connector is secured to the periphery of each second plate and each connector defines a threaded bore therein, mating with each respective threaded portion of the rod, so that each second mold plate is connected with the first mold plate by the rod and connector between the open and closed positions along the mold axis.

The portions of the rod rotate as one unit when secured together as the molding apparatus is moved between the open and closed positions. The outer rod threaded portions rotate within each bore an equal an opposite amount thereby equalizing the distances of each second mold plate from the first mold plate as the apparatus is moved between the open and closed positions. At least one outer portion is releasably detachable from the rod central portion, thereby allowing at least one second mold plate to be separated from the first plate along the mold axis beyond the open position and beyond the length of the threaded portions without axial rotation of the rod and thus without the threaded connector losing threaded engagement with the at least one threaded rod portion.

Further features and advantages of the invention will become apparent from the following detailed description, taken in conjunction with the accompanying drawings, in which:

DETAILED DESCRIPTION OF THE PREFERRED EMBODIMENTS

Figure 1:
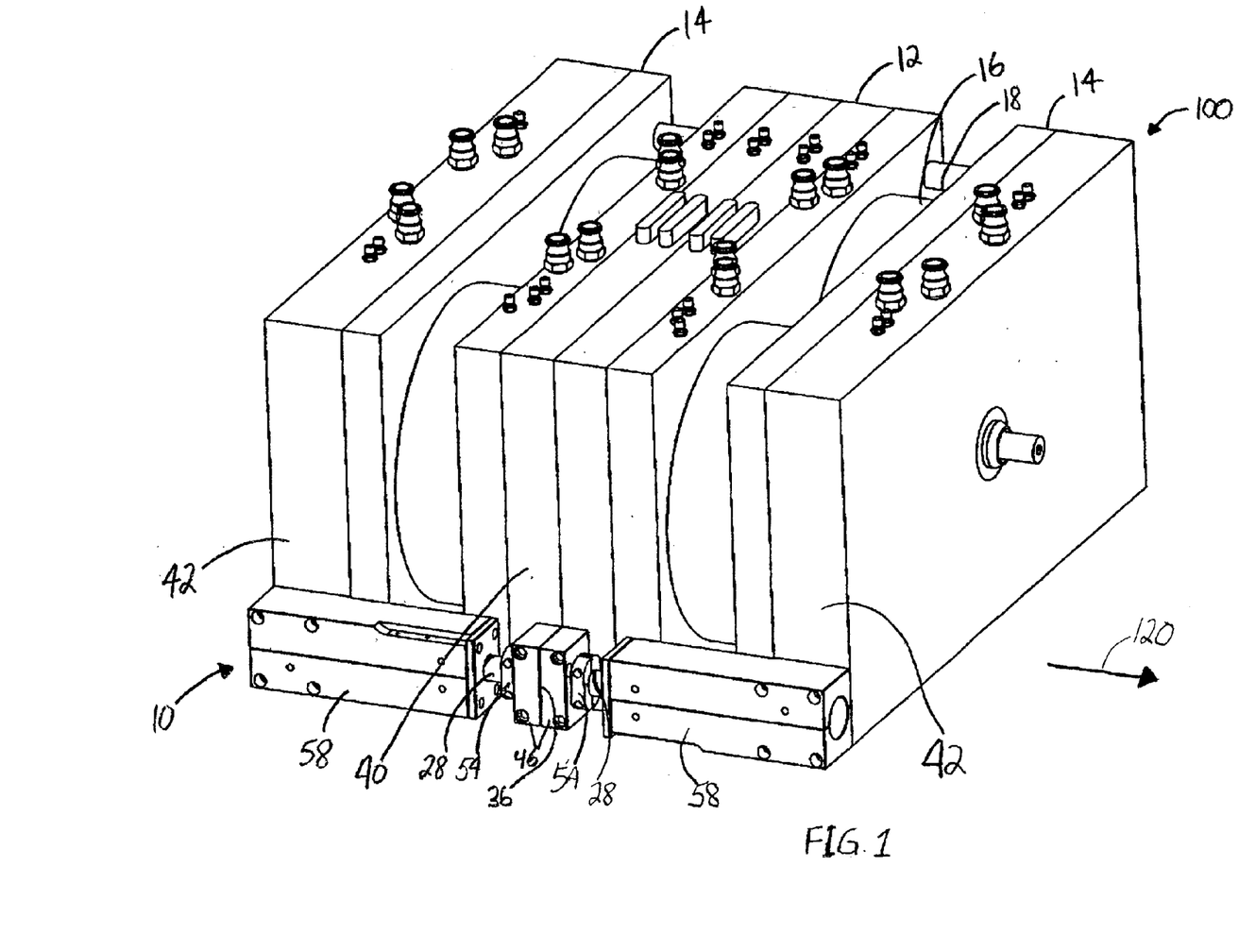
FIG. 1 is a perspective view of a stack mold and the preferred embodiment of the centering apparatus in accordance with this invention in a closed position.
Figure 2:
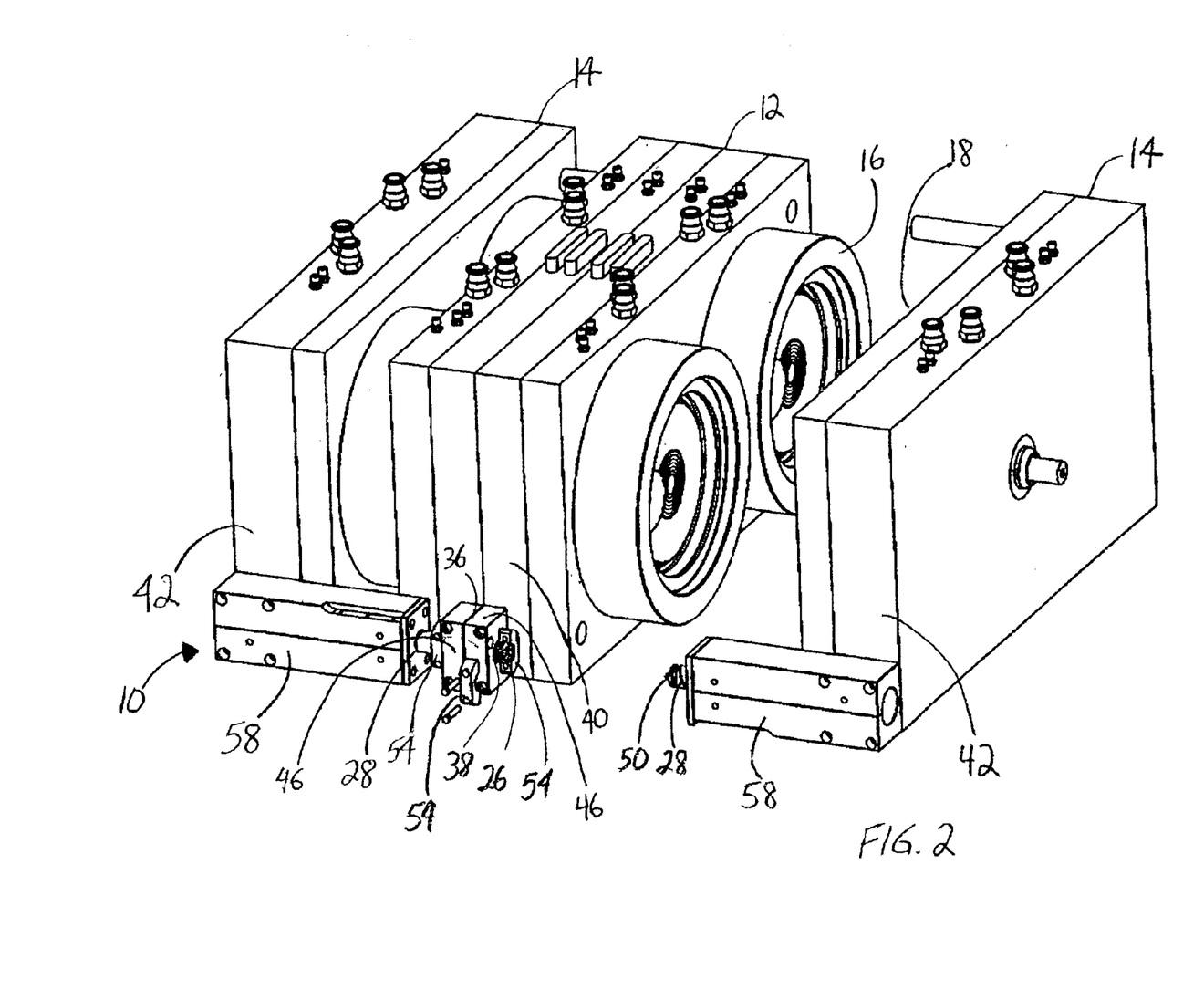
FIG. 2 is a perspective partly broken away view of a stack mold and a preferred embodiment of the centering apparatus in accordance with this invention showing a rod outer portion separated from the rod central portion.

Referring to FIGS. 1 to 5, a preferred embodiment of a centering apparatus according to the present invention is generally indicated by reference 10. The mold centering apparatus 10 controls relative movement between the mold plates in an injection stack mold apparatus, generally indicated by reference 100. The features of the stack mold 100 are conventional and as such will not be discussed in further detail below. Shown in the FIGS. 1 and 2, the stack mold used with the invention includes a first mold plate assembly 12 positioned between a pair of second mold plates 14. The first mold plate assembly 12 is connected to the second mold plates 14 by the centering apparatus of the invention 10. The mold plates are movable along a mold axis, the direction of which is indicated by arrow 120. The first plate assembly includes mold faces 16 on opposite sides thereof. The second plates 14 include second plate faces 18 designed for mating with the faces 16 such that in the closed position, as shown in FIG. 2, molten plastic may be injected between the first 16 and second 18 plate faces, for producing mold plastic products. Such molten plastic is injected between the first and second mold plate faces in a known manner, typically through sprues extending through the first plate to nozzles leading through the plate faces.

As shown in FIGS. 1 to 4, the centering apparatus includes an elongate threaded rod member 24 having a central portion 26, and two oppositely extending, outer portions 28 extending from the central portion 26 parallel to the mold axis 120 toward each of the second plates. The central portion 26 is attached to a peripheral portion 40 of the first plate, preferably by means of a connector block 36 defining an opening 38 therethrough for accepting said rod central portion 26. Preferably the central connector block 36 is releasably securable to the first plate peripheral portion 40 by means of screws inserted therethrough. The connector block may be comprised of two separate parts 46, abutting each other. The rod central portion (and as will be discussed below, the rod member when the portions of the rod member are secured together) is axially rotatable within said connector block 36 and thus with respect to the first plate. Preferably axial rotation is facilitated by bearings 72 positioned within the connector block opening. The rod member 24 is prevented from axial movement relative to said first plate. Preferably the rod central portion includes an annular flange 44 and a pair of such bearings 72 are positioned on either side of the annular flange 44. The two separable parts 46 may be inserted over opposite ends of the central portion 26 and abut each other at the position of the annular flange 44.

Figure 3:
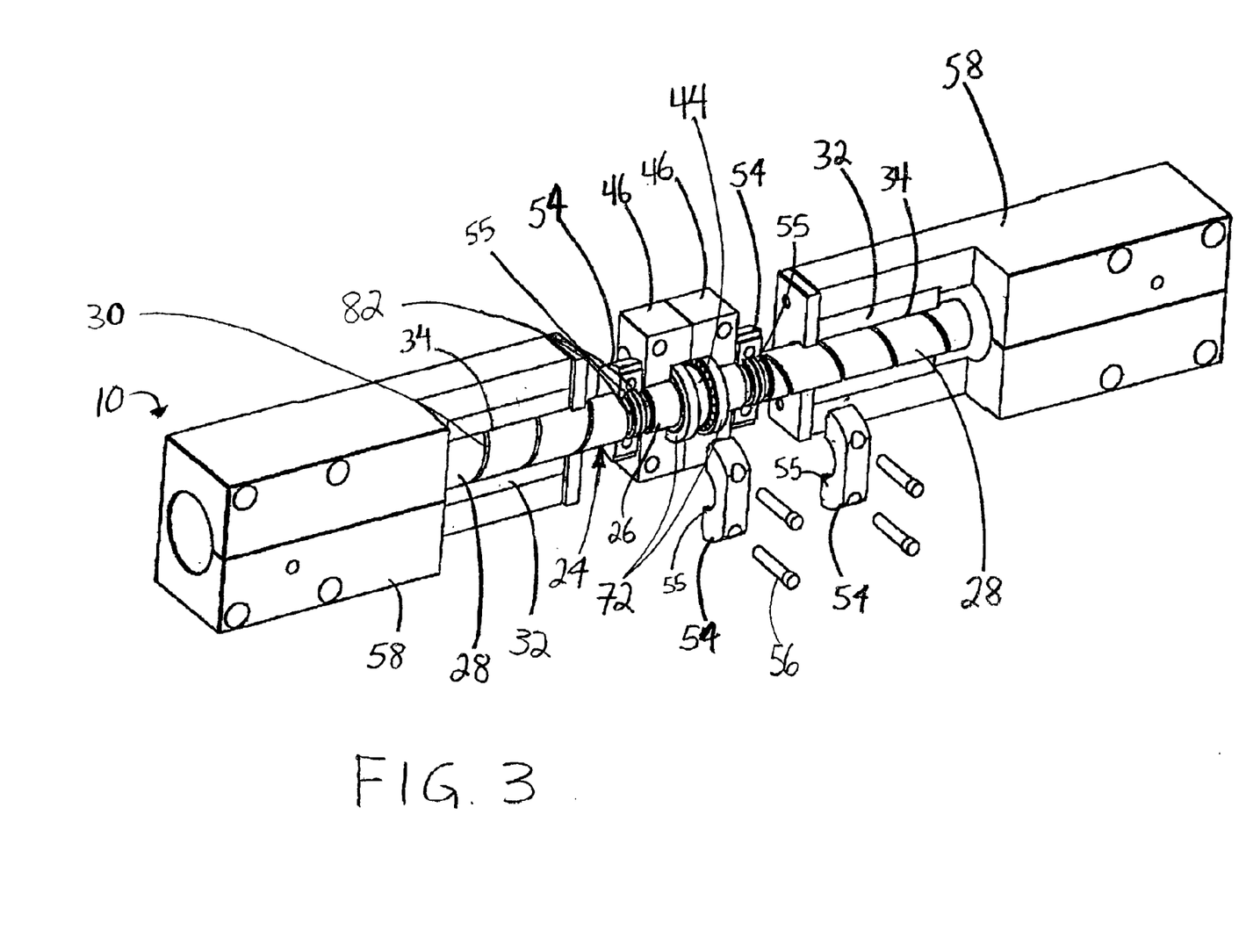
FIG. 3 is a perspective view, with portions broken away, of an embodiment of the centering apparatus in accordance with this invention in a closed position.
Figure 4:
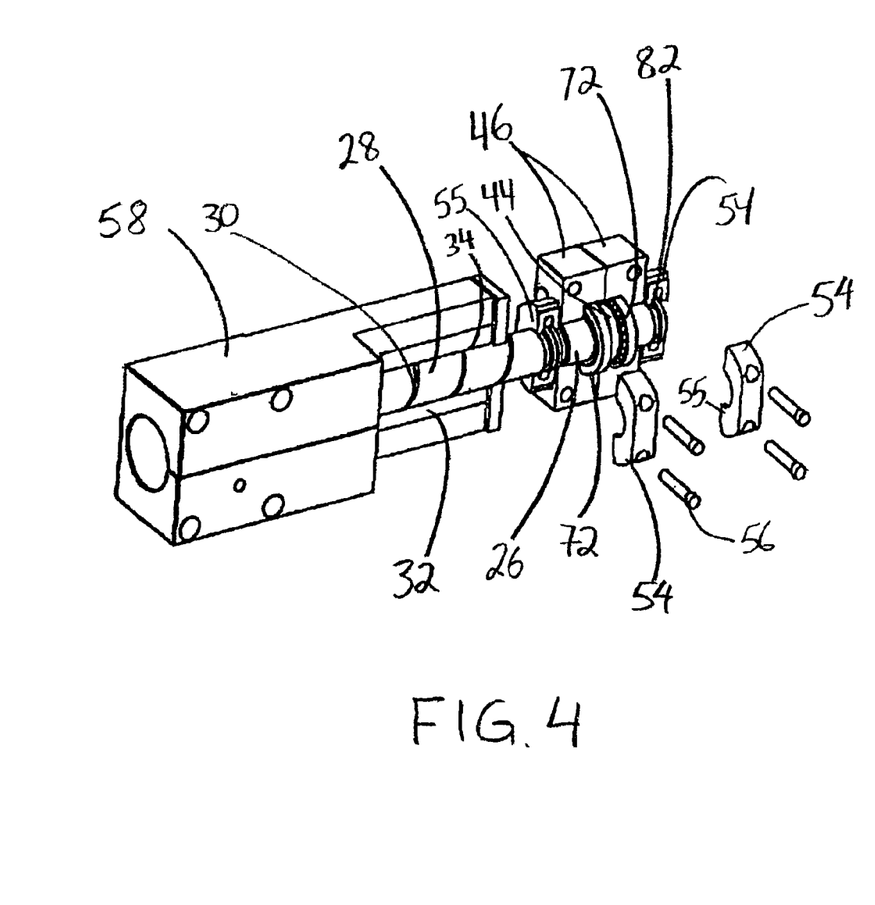
FIG. 4 is a perspective view, with portions broken away, of an embodiment of the centering apparatus in accordance with this invention showing the rod outer portion separated from the rod central portion.
Figure 5:
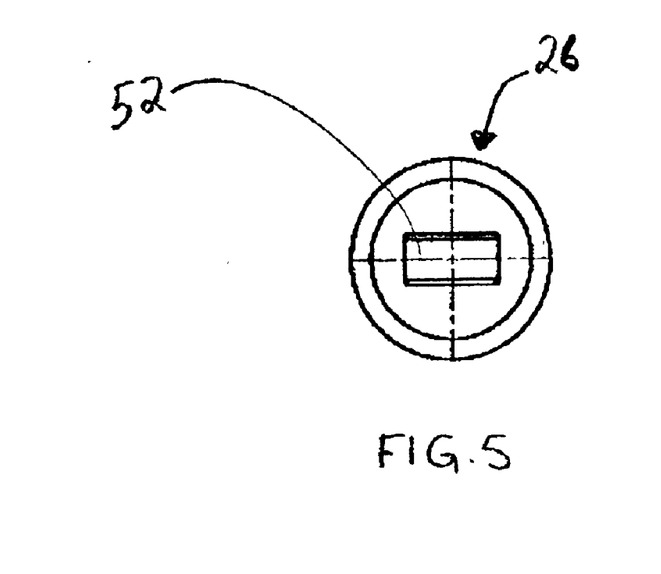
FIG. 5 is an end view of the rod central portion of the preferred embodiment of the centering apparatus in accordance with this invention.
Figure 6:
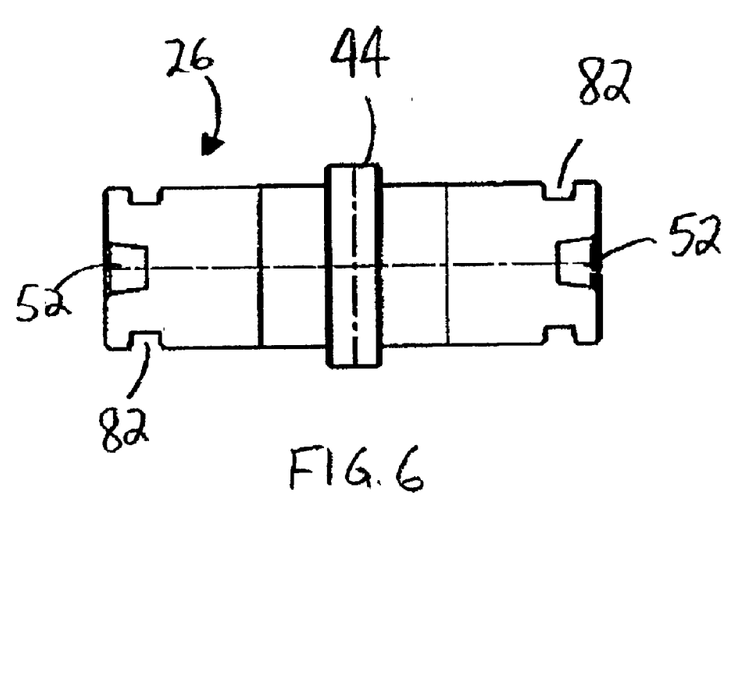
FIG. 6 is a sectional view taken along the axis of the rod, of the rod central portion of the preferred embodiment of the centering apparatus in accordance with this invention.
Figure 7:
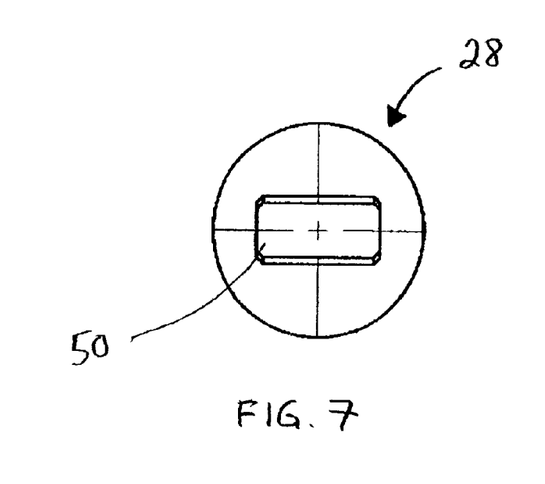
FIG. 7 is an end view of a rod outer portion of the preferred embodiment of the centering apparatus in accordance with this invention.
Figure 8:
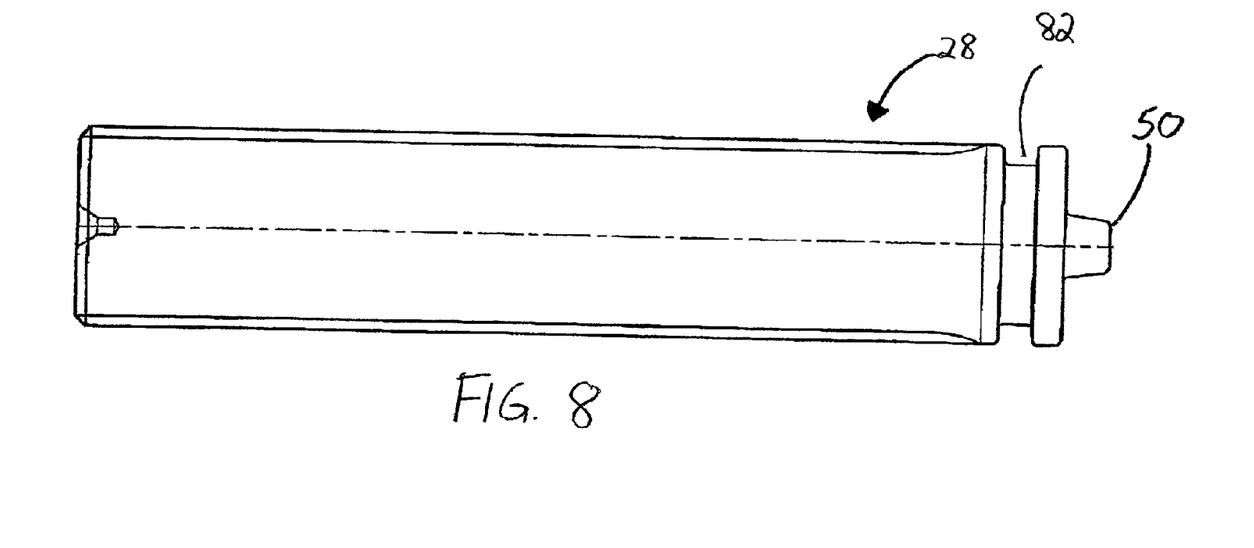
FIG. 8 side elevation view taken along the axis of a rod of the outer portion of the preferred embodiment of the centering apparatus in accordance with this invention.

Each outer portion 28 includes a threaded portion 30. As shown in FIG. 3, the threaded portions of each outer portion having the same thread pitch and count but are in opposite orientation to each other.

A threaded connector 32 is secured to the periphery 42 of each second plate and each threaded connector 32 defines a threaded bore 34 therein, mating with each respective threaded portion 30, so that each second mold plate 14 is connected with the first mold plate 12 by the rod and connector 32 between the first and second positions along the mold axis 120. Preferably the threaded connector includes an outer housing 58 which is secured to the peripheral portions 42. The outer housing 58 encloses the threaded connector leaving access for the threaded rod portion to the threaded bore 34. At least one outer portion 28, and preferably both outer portions 28 are releasably detachable from the rod central portion 26, thereby allowing the second mold plate 14 to be separated from the first plate 12 along the mold axis 120 beyond the open position and beyond the length of the threaded portions without axial rotation of the rod and thus without the threaded connectors 32 losing threaded engagement with the threaded rod portions 30.

Preferably as shown in FIGS. 2 and 4 to 8, the rod outer portion includes an inner end facing the rod central portion 26, the inner end including a key portion 50 extending toward the rod central portion 26. The ends of the rod central portion each include a mating slot 52 for accepting the key portion 50. Preferably each key portion 50 is tapered as each extends toward said rod central portion allowing for improved fitting of the portions together.

It should be understood that although the drawings illustrate that the key portion 50 is positioned on the rod outer portion 28 and the slot 52 on the rod inner portion 50, it is possible that the key portion 50 may be positioned on the rod central portion 26 and the slot 52 on the rod outer portion. The key and slot may be configured in any suitable shape including standard configurations such as the cross type key shape or the like.

Preferably a quick disconnect clamp 54 is insertable over each joint between the rod central 26 portion and rod outer portion 28, facilitating quick attachment and removal thereof. Preferably an annular groove 82 is positioned adjacent to each end of the rod central portion 26 and adjacent to the end of the rod outer portion 28 which mates with the rod central portion. These annular grooves accommodate the walls 55 of the clamp which allow for easy alignment of the clamp over the joint. The clamp illustrated in the drawings is a two piece clamp securable by means of releasable pins or screws 56 therethrough connecting the two pieces together to encapsulate each joint. Shown in FIGS. 1, 3 and 4 the clamps 54 on both ends of the central portions are opened. Although the Figures show a two piece clamp, any suitable clamp device known to persons skilled in the art could be utilized.

When secured together, as shown in FIG. 1, the portions of the rod rotate as one unit as the molding apparatus is moved between the open and closed positions. The rod outer portion 28 threaded portions 30 rotate within each bore 34 an equal an opposite amount thereby equalizing the distances of each second mold plate 14 from the first mold plate 12 as the apparatus is moved between the open and closed positions. When the rod outer portion 28 is disengaged from the rod central portion 26 after opening the clamp, the respective second plate to which that rod outer portion is connected may be opened beyond the open position as shown in FIG. 2, without axial rotation of the rod and thus without the threaded connector 32 losing threaded engagement with the threaded rod portion 30.

Figure 9:
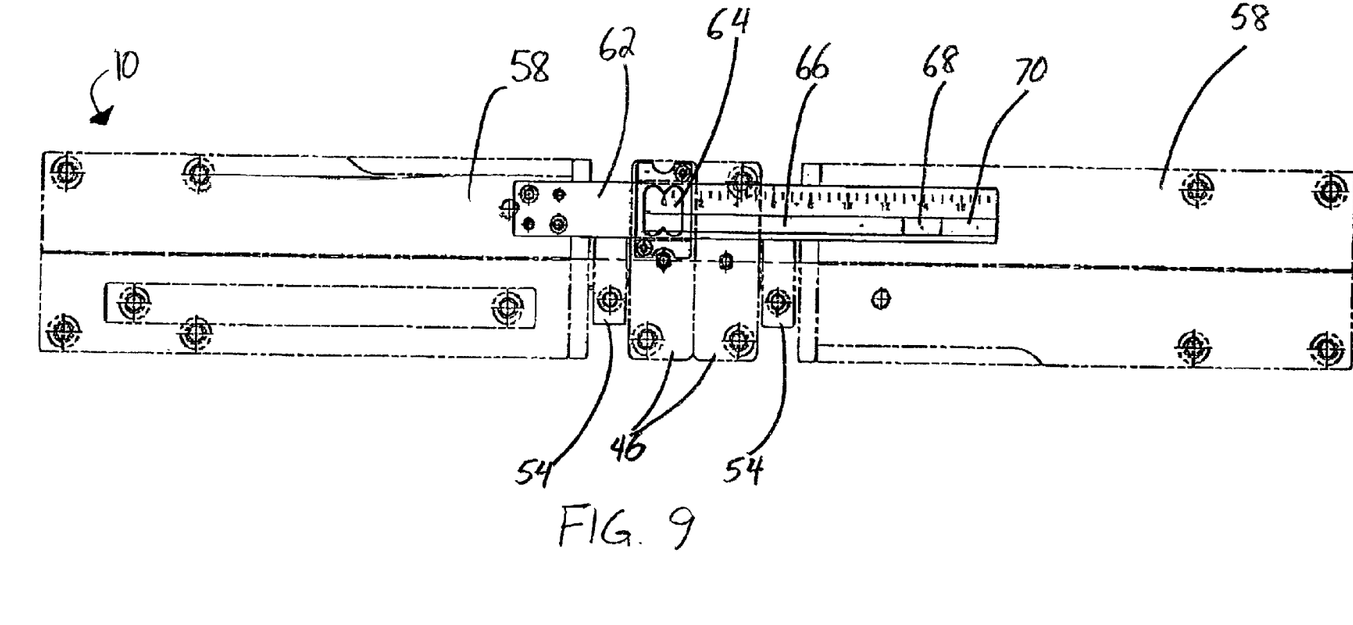
FIG. 9 is a side elevation view of a preferred embodiment of the centering apparatus in accordance with the invention illustrating the use of a marker to indicate the position of the plates.

Shown in FIG. 9 is an embodiment of the centering apparatus of the invention which includes a marker, preferably an elongate marker member 62 secured to the outer housing 58 of one said second plate 14 for indicating the position of the mold plates 12, 16 along the mold axis indicated by arrow 120. The marker member 62 extends over the rod central portion. The marker member 62 passes over a markation area 64. The markation area 64 is positioned so that it is visible to the mold operator. For example, as shown in FIG. 9, the marker member 62 is secured to the side of the outer housing opposite the stack mold 100, thus allowing such visibility by the mold operator. The marker member is sized such that when said second plates are positioned between said closed position and said open position a first discrete portion 66 of the marker is positioned in the markation area 64. Preferably this first discrete portion is green in colour. When said second plates are in the open position (i.e. maximum separation of the first and second plates without losing threaded engagement between the rod threaded portions and the bores), a second discrete portion 68 of the marker member is positioned in the markation area 64. Preferably this second discrete portion is yellow in colour. When the second plates extend beyond the open position a third discrete portion 70 of the marker is positioned in the markation area 64. Preferably this third discrete portion is red in colour. Using a colour coding marking scheme to indicate the position of the stack mold provides a quick and easily identified location to the mold user. Preferably the stack mold will be provided with a legend indicating the significance of the presence of each colour in the markation area. Although not shown in the drawings, it should be understood that the marker member 62 could be attached to the periphery 42 of a second plate extending parallel to the mold axis, with the markation area 64 positioned on the periphery 40 of the first plate, visible to the mold user.

Preferably, a centering apparatus as described and shown above will be positioned on opposite sides of the stack mold 100 to maximize stability of the stack mold.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A mold centering apparatus for controlling relative movement between mold plates in a stack mold, said stack mold having a first mold plate positioned between a pair of second mold plates, said first mold plate connected to said second mold plates by said centering apparatus, said mold plates being movable along a mold axis between an open position and a closed position, said first mold plate having mold faces on opposite sides of said first plate, said second plates being designed for mating with the faces on opposite sides of the first plate such that in said closed position molten plastic may be injected between said first and second plates, for producing molded plastic products, said centering apparatus comprising: an elongate threaded rod member comprising a central portion, and two oppositely extending, outer portions extending from said central portion parallel to said mold axis toward each said second plate, said central portion being attached to a peripheral portion of the first plate, said rod member being axially rotatable with respect to said first plate, said rod being prevented from axial movement relative to said first plate, each said outer portion including a threaded portion, the threaded portions of each said outer portion having the same thread count and pitch but being in opposite orientation to the other; a threaded connector secured to the periphery of each said second plate, each said connector defining a threaded bore therein, mating each respective threaded portion of the threaded rod, so that each second mold plate is connected with the first mold plate by said rod and connector to move between the open and closed positions along the mold axis upon rotation of the threaded rod; said portions of the rod rotating as one unit when secured together as the molding apparatus is moved between the open and closed positions, the outer rod portions rotating within each said bore an equal an opposite amount thereby equalizing the distances of each second mold plate from the first mold plate as the apparatus is moved between the open and closed positions; at least one rod outer portion being releasably detachable from said rod central portion, thereby allowing at least one said second mold plate to be separated from said first plate along the mold axis beyond said open position and beyond the length of the threaded rod without axial rotation of said rod and thus without said threaded connector losing threaded engagement with the at least one threaded rod portion.

2. A mold centering apparatus as recited in claim 1 wherein both outer rod portions are releasably detachable from said central portion.

3. A mold centering apparatus as recited in claim 1 wherein said central rod portion is attached to the peripheral portion of said first plate by means of a central connector block defining an opening therethrough for accepting said rod central portion, said central connector block being releasably securable to said first plate peripheral portion.

4. A mold centering apparatus as recited in claim 1 wherein said central rod portion includes an annular flange.

5. A mold centering apparatus as recited in claim 1 wherein bearing means positioned within said center block piece facilitates said axial rotation of the rod.

6. A mold centering apparatus as recited in claim 1 wherein said at least one detachable rod outer portion includes a key portion extending toward said center rod portion, at least one end of said central portion including a mating slot for accepting said key portion.

7. A mold centering apparatus as recited in claim 6 wherein each said key portion is tapered as each extends toward said rod central portion.

8. A mold centering apparatus as recited in claim 1 wherein said central portion includes a key portion extending from each of its opposite ends and each outer portion includes a tapered slot for accepting each said key portion.

9. A mold centering apparatus as recited in claim 8 wherein each said key portion is tapered as each extends in said opposite directions.

10. A mold centering apparatus as recited in claim 1 wherein a quick disconnect clamp releasably secures said at least one detachable outer portion to said central portion.

11. A mold centering apparatus as recited in claim 10 wherein said clamp is a two piece clamp securable by means of releasable pins therethrough connecting the two pieces together to encapsulate each joint.

12. A mold centering apparatus as recited in claim 1 wherein said threaded connector further comprises an outer housing secured to the peripheral portion of each said second mold plates enclosing said threaded connector, but leaving access to the threaded bore for insertion of said rod threaded portion therein.

13. A mold centering apparatus as recited in claim 12 wherein said centering device further comprises indicator means secured to said outer housing for indicating the position of the mold plates along the mold axis between the open and closed positions.

14. A mold centering apparatus as recited in claim 13 wherein said centering device further comprises a marker member secured to the outer housing of one said second plate for indicating the position of the mold plates along the mold axis, said marker member extending along said mold axis toward said central portion, over a markation area, said markation area visible to the mold operator, said marker member positioned such that when said second plates are in said open position, a first discrete portion of the marker member is positioned in the markation area, and when said second plates are positioned between said closed position and said open position a second discrete portion of the marker member is positioned in the markation area, thereby indicating the position of the stack mold by viewing said markation area.

15. A mold centering apparatus as recited in claim 13 wherein said centering device further comprises a marker member secured to the peripheral portion of one said second plate for indicating the position of the mold plates along the mold axis, said marker member extending along said mold axis, over a markation area, said markation area visible to the mold operator and positioned on the peripheral portion of said first plate, said marker member positioned such that when said second plates are in said open position, a first discrete portion of the marker member is positioned in the markation area, and when said second plates are positioned between said closed position and said open position a second discrete portion of the marker member is positioned in the markation area, thereby indicating the position of the stack mold by viewing said markation area.

16. A mold centering apparatus as recited in claim 14 wherein said marker member includes a third discrete portion, which is positioned in markation area when said second plates extend beyond the open position.

17. A mold centering apparatus as recited in claim 16 wherein said first discrete portion is green, said second discrete portion is yellow and said third discrete portion is red in colour.

* * * * *

UNITED STATES PATENT AND TRADEMARK OFFICE
CERTIFICATE OF CORRECTION

PATENT NO. : 6,779,999 B2 Page 1 of 1
APPLICATION NO. : 10/121371
DATED : August 24, 2004
INVENTOR(S) : Ciccone It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (173) days Delete the phrase "by 173" and insert -- by 154 days--

Signed and Sealed this

Twenty-second Day of May, 2007

JON W. DUDAS
*Director of the United States Patent and Trademark Office*